Oct. 27, 1931.    H. BOHMER, JR    1,829,709
GASKET
Filed April 12, 1930
FIG. I.
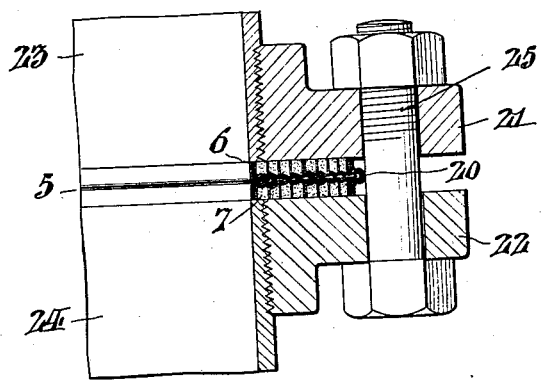
FIG. II.
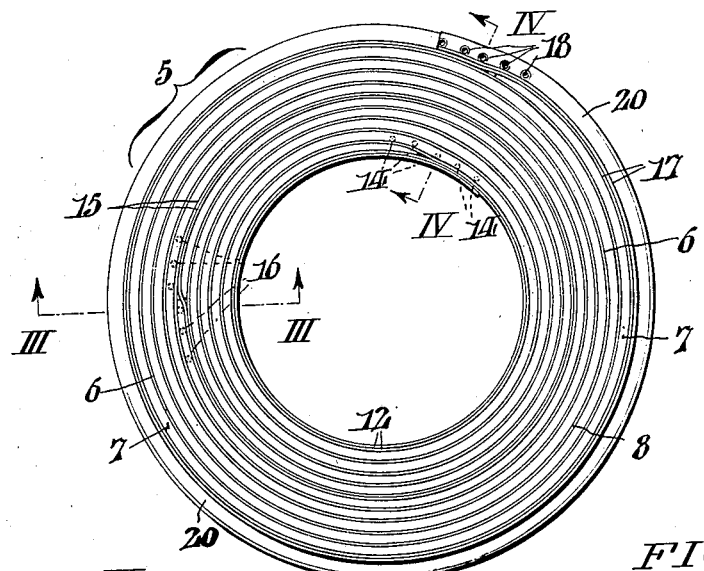
FIG. III.
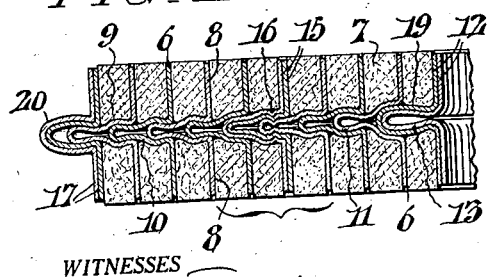
FIG. IV.
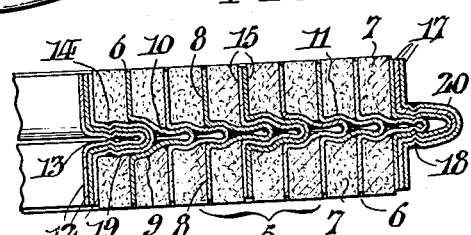
WITNESSES
Hubert Fuchs
George M. Muschamp
INVENTOR:
Henry Bohmer, Jr.,
BY Fraley Paul
ATTORNEYS.

Patented Oct. 27, 1931

1,829,709

UNITED STATES PATENT OFFICE

HENRY BOHMER, JR., OF HADDONFIELD, NEW JERSEY, ASSIGNOR TO FLEXITALLIC GASKET CO., OF CAMDEN, NEW JERSEY, A CORPORATION OF NEW JERSEY

GASKET

Application filed April 12, 1930. Serial No. 443,699.

This invention relates to compressible gaskets for interposition between connected ends of conduit junctures to prevent leakage thereat.

More particularly the present improvements have reference to the type of gasket comprising spirally wound metallic strip having the adjacent convolutions interengagingly joined by integral portions thereof, with a non-metallic packing occupying the spaces intervening said convolutions.

The primary object of this invention is to provide an improved gasket of the typified form, that is locally reinforced to better resist the compressive and radial strains to which such gaskets are customarily subjected.

Another object is to provide a gasket of the kind referred to characterized by inner, outer and intervening, metallic reinforcements which jointly serve to strengthen said gasket against both compressive and lateral forces tending to cause undesirable spreading, whereby the general efficiency of such devices to withstand high pressures is enhanced.

A further object is to provide a novel form of reinforced gasket of the character above mentioned which possesses great strength and is highly efficient in use.

With the foregoing and other objects in view, this invention essentially consists in forming at intervals of the spirally wound metallic strip overlapping continuous convolutions which are appropriately secured together to set up buttress reinforcements at the outer, inner, and intervening parts of the gasket, whereby its resistivity to compression and lateral distortion is correspondingly increased.

The invention will now be set forth more explicitly by reference to the accompanying drawings, which constitute a part of this specification, and then more specifically defined in the claims at the end of such description.

In the drawings:

Fig. I is a fragmentary sectional view of a pipe flange juncture with an interposed gasket embracing the present improvements.

Fig. II is a plan view of a complete gasket in accordance with this invention.

Fig. III is a radial section, on a larger scale, taken as indicated by the arrows III—III in the preceding view; and, Fig. IV is a similar sectional view, taken on the plane designated IV—IV in Fig. II.

Referring more in detail to the several illustrations, my novel gasket is comprehensively designated by the reference 5, the same being shown for convenience of annular form. This gasket 5 preferably consists of continuous metallic strip wound edgewise in the form of a spiral to provide a plurality of convolutions 6 with interposed non-metallic packing 7 simultaneously wound therewith.

Prior to winding, the metallic strip is suitably fashioned, lengthwise thereof, to provide aligned flats 8 with an intervening hollow flange-like portion embodying opposing corrugations 9, 10, of differing curvature, connected by a concavo-convex bead or edge 11.

Metallic strip, fashioned as just described is initially wound upon itself, to form overlapping inner convolutions 12 with the hollow lateral corrugate portions 9, 10 interlocking, as shown at 13, Figs. III and IV, and suitably secured together as by clinchings 14, for example. Non-metallic packing 7 is now applied above and below the corrugate portions 9, 10 and the operation of spirally winding both said packings and the metallic strip continues for a number of convolutions, whereupon the packing is interrupted and said metallic strip again overlappingly coiled to provide a multiple reinforcing band of the contiguous reinforced convolutions 15, secured as before by clinchings 16. The packing 7 is again applied and winding of the gasket resumed until the peripheral or outer convolutions 17 are formed as above set forth, whereupon the end of the metallic strip is secured to the co-active corrugate portion 9, 10 as by clinchings 18. The closed intermediate reinforcing band formed by fixedly securing the convolutions 15, 15 by the clinchings 16 serves to limit or prevent radial expansion of the convolutions and of the gasket.

Incidentally, it will be observed that consequent upon the procedure just described the gasket 5 is provided with inner and outer hollow mainly uniform-section ribs 19, 20 respectively, excepting at the clinchings 14, 18, whereat said ribs assume somewhat wedge shape; all as will be readily understood by those acquainted with the art to which this invention appertains. Attention is likewise directed to the fact that initially the packings 7 project slightly beyond the longitudinal edges of the metallic strip flats 8, so that when the gasket 5 is subjected to compressive force the respective components are firmly bonded, while said packings also envelope the metallic strip intermediate the overlapping convolutions 12, 17 and further assure a firm interlock throughout all portions of said gasket.

The use of my novel gasket will be readily appreciated from the fragmentary showing of Fig. I, wherein it is interposed between the flanges 21, 22 of aligned pipe sections 23, 24, respectively; said flanges being drawn together by bolts 25 (one only being shown) into firm compressive contact with said gasket. Incident to compression of the gasket 5 by tightening up of the bolts 25, the former affords an effective seal between the flanges 21, 22, which is characterized by great resistivity to crushing or radial strains; while spreading of said gasket even under abnormally high pressures is prevented due to the rigidly bonded reinforces 12, 15 and 18 formed in continuity from the metallic strip.

From the foregoing it is thought my invention will be fully understood, but it is desired to herein note that while I have described formation of only one intermediate reinforce convolution 15, any number thereof may be interposed between the inner and outer edges of the gasket 5. Again, I do not restrict myself to the illustrated type of interlocking connection set up by the parts 9, 10 and 11, between the convolutions 6 or to the manner of securing the overlapping convolutions 12, 15 and 18, together by clinching; therefore without limiting myself to the construction shown, or enumerating equivalents, the right is hereby reserved to such modifications thereof as are encompassed by reasonable interpretation of the following claims.

Having thus described my invention what I claim is:—

1. A gasket formed of strip metal spirally wound with non-metallic packing interposed between its convolutions, certain successive intermediate convolutions of the strip metal being fixedly secured together to form closed reinforcing bands amongst the convolutions of the gasket, thereby limiting radial expansion of the convolutions.

2. A gasket formed of strip metal spirally wound with non-metallic packing interposed between its convolutions, said packing being, however, omitted between certain successive convolutions of the strip metal, and the latter secured together where they come in contact, so as to form closed multiple reinforcing bands within the confines of the gasket.

3. A gasket formed of strip metal having its central portion doubled to form a hollow laterally outstanding longitudinal rib and spirally wound with non-metallic packing interposed between its convolutions and their ribs interengaged one within the other, said packing being omitted, however, between certain successive intermediate convolutions and the latter brought into contact and secured to one another by their interfitting ribs, so as to form closed multiple reinforcing bands within the confines of the gasket.

In testimony whereof, I have hereunto signed my name at Philadelphia, Pa., this 9th day of April, 1930.

HENRY BOHMER, Jr.